(12) United States Patent
Szela et al.

(10) Patent No.: US 7,966,707 B2
(45) Date of Patent: Jun. 28, 2011

(54) METHOD FOR REPAIRING SUPERALLOY COMPONENTS USING INSERTS

(75) Inventors: Edward R. Szela, West Springfield, MA (US); Norman Pietruska, Durham, CT (US)

(73) Assignee: United Technologies Corporation, Hartford, CT (US)

( * ) Notice: Subject to any disclaimer, the term of this patent is extended or adjusted under 35 U.S.C. 154(b) by 1202 days.

(21) Appl. No.: 11/123,769

(22) Filed: May 6, 2005

(65) Prior Publication Data

US 2006/0248719 A1    Nov. 9, 2006

(51) Int. Cl.
*B23P 6/00* (2006.01)
*B23K 20/18* (2006.01)

(52) U.S. Cl. ......... 29/402.11; 29/889.1; 29/402.09; 29/402.16; 29/402.18; 228/118; 228/119

(58) Field of Classification Search ......... 29/889.1, 29/402.09, 402.11, 402.16, 402.18, DIG. 48; 228/118, 119
See application file for complete search history.

(56) References Cited

U.S. PATENT DOCUMENTS

| | | | |
|---|---|---|---|
| 3,809,553 A * | 5/1974 | Peaslee | 419/33 |
| 4,008,844 A | 2/1977 | Duvall et al. | |
| 4,285,459 A | 8/1981 | Baladjanian et al. | |
| 4,726,104 A | 2/1988 | Foster et al. | |
| 4,822,248 A | 4/1989 | Wertz et al. | |
| 5,732,467 A | 3/1998 | White et al. | |
| 5,783,318 A | 7/1998 | Biondo et al. | |
| 5,935,718 A | 8/1999 | Demo et al. | |
| 6,049,978 A | 4/2000 | Arnold | |
| 6,503,349 B2 | 1/2003 | Pietruska et al. | |
| 6,530,971 B1 | 3/2003 | Cohen et al. | |
| 6,742,698 B2 | 6/2004 | Shah et al. | |
| 6,986,810 B1 * | 1/2006 | Behi | 106/157.2 |
| 2003/0226878 A1 | 12/2003 | Shah et al. | |
| 2005/0061858 A1 * | 3/2005 | Ditzel et al. | 228/248.1 |
| 2006/0248718 A1 | 11/2006 | Szela et al. | |

FOREIGN PATENT DOCUMENTS

SU        597512 A   *  3/1978
WO    03/048528 A      6/2003

OTHER PUBLICATIONS

Patent Abstracts of Japan, vol. 013, No. 122, Mar. 27, 1989 (JP 63295802) (Toshiba Corp.), Dec. 2, 1988.
Patent Abstracts of Japan, vol. 006, No. 056, Apr. 13, 1982 (JP 56167802) (Toshiba Corp.), Dec. 23, 1981.
Patent Abstracts of Japan, vol. 004, No. 084, Jun. 17, 1980 (JP 55042129) (Hitachi Corp.), Mar. 25, 1980.
Patent Abstracts of Japan, vol. 2003, No. 12, Dec. 5, 2003 (JP 2004084604) (Mitsubishi Heavy Ind. Ltd.), Mar. 18, 2004.

* cited by examiner

*Primary Examiner* — David P Bryant
*Assistant Examiner* — Sarang Afzali
(74) *Attorney, Agent, or Firm* — Bachman & LaPointe, P.C.

(57) ABSTRACT

A method for forming or remanufacturing a component to have an internal space. A refractory metal blocking element is formed, in situ, with at least a portion to be within the internal space. A material is added by at least one of welding, laser cladding, and diffusion brazing, the blocking element at least partially blocking entry of the material to the internal space. The blocking element is removed.

27 Claims, 2 Drawing Sheets

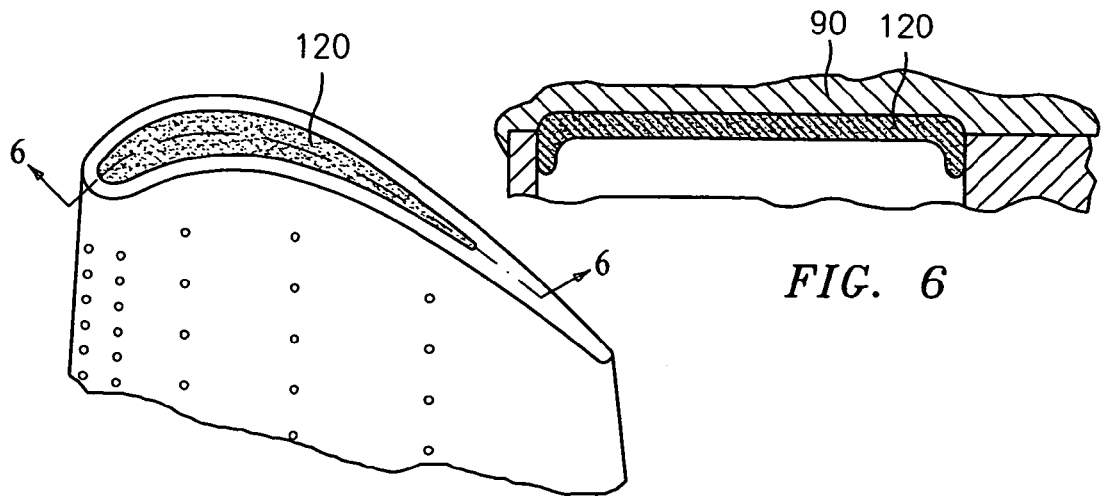
FIG. 5
FIG. 6
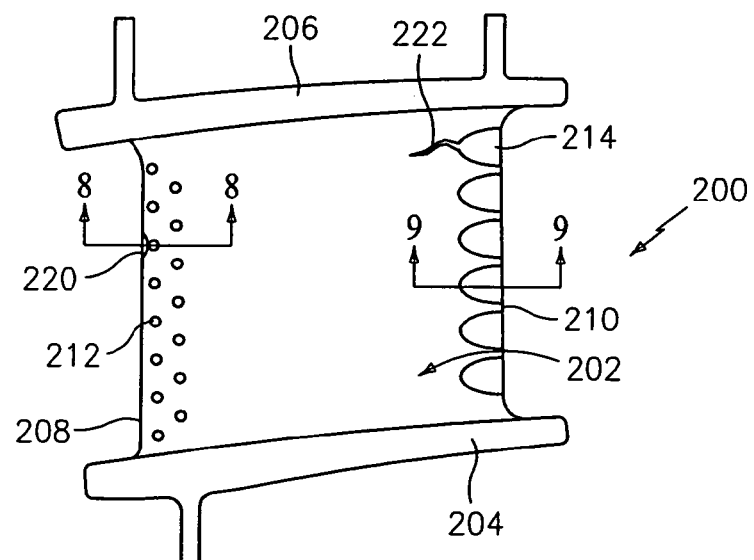
FIG. 7
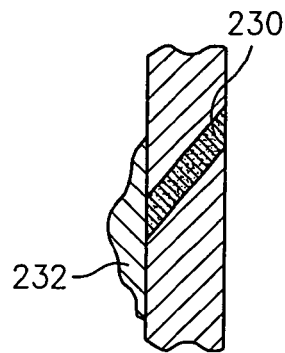
FIG. 8
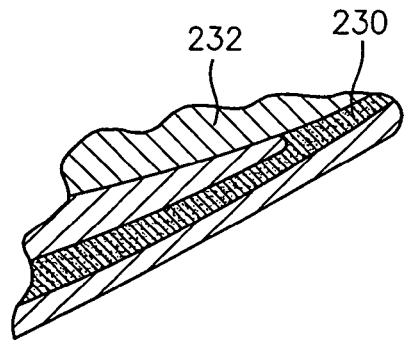
FIG. 9

METHOD FOR REPAIRING SUPERALLOY COMPONENTS USING INSERTS

BACKGROUND OF THE INVENTION

The invention relates to the manufacture, remanufacture, and restoration of nickel- or cobalt-based superalloy parts. More particularly, the invention relates to the restoration and/or remanufacture of defective, worn, and/or damaged gas turbine engine components including turbine and compressor blades and vanes, blade outer air seals, and transition duct segments.

The components of gas turbine engines are subject to wear and damage. Even moderate wear and damage of certain components may interfere with optimal operation of the engine. Particular areas of concern involve parts which interact with the gas path such as seals and the airfoils of various blades and vanes. Wear and damage may interfere with their aerodynamic efficiency, produce dynamic force imbalances, and even structurally compromise the worn/damaged parts in more extreme cases.

Various techniques have been proposed for more extensive restoration of worn or damaged parts of gas turbine engines. U.S. Pat. No. 4,822,248 discloses use of a plasma torch to deposit nickel- or cobalt-based superalloy material. U.S. Pat. No. 5,732,467 identifies the use of high velocity oxy-fuel (HVOF) and low pressure plasma spray (LPPS) techniques for repairing cracks in such turbine elements. U.S. Pat. No. 5,783,318 also identifies LPPS techniques in addition to laser welding and plasma transferred arc welding. U.S. Pat. No. 6,049,978 identifies further use of HVOF techniques. Such techniques have offered a limited ability to build up replacement material to restore an original or near original cross-section. However, the structural properties of the replacement material may be substantially limited relative to those of the base material. U.S. Pat. Nos. 4,008,844 and 6,503,349 disclose methods and repair materials for transient liquid phase diffusion brazing repairs. Such a repair material is available under the trademark TURBOFIX.

Cracks tend to be rather narrow (e.g., 0.25 mm or less), but can be much wider depending upon engine exposure and oxidation. For thin cracks, it may be advantageous to form a diffusion bond crack repair (i.e., without machining out the crack to broaden the crack). This is also identified as "healing" the crack in a metallic substrate. An advantage of a healing is that the small transverse distances across the crack permit substantial diffusion, allowing the melting point depressants to diffuse out from the material within the crack and leaving highly near base metal composition. For typical nickel-base superalloys this results in an isothermally solidified structure whose mechanical properties are near that of the base metal.

For larger defects (e.g. large chips, wear areas, or contaminated cracks requiring routing out to provide a clean base metal surface) a "build-up" repair is required (e.g., wherein portions of the repair material are more than about 1 mm from the nearest base metal of the substrate). In many cases, a common alloy mixture may be used for both crack and build-up repairs although specifically designed "preforms" (i.e., prostheses) may be developed for a recurrent build-up repair. For build-up repairs, usually only a partial isothermal structure is achieved due to limitations in diffusion time relative to the required diffusion distances. As such, the build-up repair will have a coarse, more globular, type of microstructure while the crack repair will tend to look much like the base alloy with a defined grain structure.

For parts having cooling passageways, various techniques have been proposed for preserving those passageways when the passageways intersect the damage or wear site. U.S. Pat. No. 6,742,698 discloses a refractory metal insert used with welding repairs along a trailing edge region of an airfoil. U.S. Pat. No. 5,935,718 discloses inserts used in brazing and solder repairs.

SUMMARY OF THE INVENTION

Accordingly, one aspect of the invention involves a method for forming or remanufacturing a component to have an internal space. A refractory metal blocking element is formed, in situ, with at least a portion to be within the internal space. A material is added by at least one of welding (e.g., gas tungsten arc welding), laser cladding and diffusion brazing, the blocking element at least partially blocking entry of the material to the internal space. The blocking element is removed.

In various implementations, the forming may include inserting a pre-formed first part of the blocking element and forming, in situ, a second part of the blocking element. The forming of the first part may include one or more of cutting from sheet stock, stamping, and casting. The second part may be formed from a refractory metal powder and binder combination. The second part may consist essentially of said refractory metal powder and said binder. The refractory metal powder may comprise a mixture of refractory metals.

The forming may comprise mixing a refractory metal powder and a binder. The mixed refractory metal powder and binder may be applied to the component. The applied refractory metal powder and binder may be shaped.

The portion may comprise a first portion inserted within a pre existing portion of the internal space and a second portion. The component may have previously lacked said internal space. The adding may comprise diffusion brazing using a powdered material comprising a mixture of first and second component powders, the second powder being a majority, by weight, of the powdered material and the first powder acting to infiltrate the second powder upon melting of the first powder. The first powder component may include in its composition a quantity of a melting point depressant substantially in excess of that in the second powder. The first and second component powders may be present in a mass ratio of between 1:10 and 1:2. The first component powder may have at least 2.5% boron and the second component powder may have less than 0.5% boron. The first component powder may have at least 2% boron and the second component powder may have less than 1% boron. The first and second component powders may be nickel based. The internal space may extend to a damage site from which the component has lost first material. The method may further comprise removing additional material at least partially from the damage site to create a base surface. The adding of the material may add the material atop the base surface at least partially in place of the first material and the additional material. The material may in major part replace said first material. The blocking element may have a first surface portion having a shape effective to re-form an internal surface portion of the component bounding the internal space. The placing may cause the first surface portion to at least partially protrude from an intact portion of the component. The adding of the material may include adding the material atop the first surface portion. The component may be an internally-cooled gas turbine engine turbine section element. The material may be selected from the group consisting of Ni- or Co-based superalloys. The component may comprise a substrate material selected from the group consisting of Ni- or Co-based superalloys. The component may be a blade having an airfoil and the material may be added along a tip of the airfoil. The component may be a blade or vane having an airfoil and the material may be added along a trailing edge of the airfoil. The material may be added to a depth of at least 2.0 mm. The method may further comprise machining the material to restore an external contour of the airfoil. The positioning of the blocking element may comprise trimming a pre formed insert. The removing may comprise at least one of chemically removing and mechanically removing. The removing may comprise pulling. The method may be a portion of a reengineering and remanufacturing process wherein the component has been in service without said internal space and said internal space functions to increase resistance to thermal-mechanical fatigue.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 is an enlarged view of a portion of the airfoil of the blade of FIG. 1 during an intermediate stage of an alternative repair.

FIG. 6 is a sectional view of the airfoil of FIG. 5.

FIG. 7 is a view of a turbine vane of a gas turbine engine.

FIG. 8 is a sectional view of an airfoil of the vane of FIG. 7 during an intermediate stage of repair taken along line 8-8.

FIG. 9 is a partial sectional view of an airfoil of the vane of FIG. 7 during an intermediate stage of repair taken along line 9-9.

Like reference numbers and designations in the various drawings indicate like elements.

DETAILED DESCRIPTION

Figure 1:
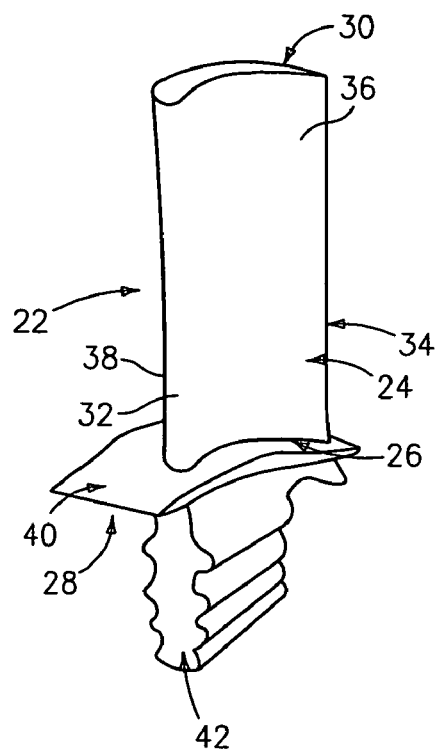
FIG. 1 is a view of a turbine blade of a gas turbine engine.

FIG. 1 shows a turbine element (e.g., a gas turbine engine turbine blade 22). The exemplary blade 22 includes an airfoil 24 extending from a root 26 at a platform 28 to a tip 30. The airfoil has leading and trailing edges 32 and 34 separating pressure and suction sides 36 and 38. The platform 28 has an outboard portion 40 for forming an inboard boundary/wall of a core flowpath through the turbine engine. A mounting portion or blade root 42 depends centrally from the underside of the platform 28 for fixing the blade in a disk of the turbine engine. Optionally, all or some portion (e.g., the platform 28 and airfoil 24) may be coated. A cooling passageway network (not shown in FIG. 1) may extend through the blade from one or more inlets in the root to multiple outlets along the blade sides, edges, tip, and/or root. Exemplary blades may be made from nickel- or cobalt-based superalloys.

Various portions of the blade or other component may be subject to various kinds of damage. Repairing or remanufacturing the blade may, therefore, require the addition of material to replace lost material. Also, the addition of material may be appropriate in a variety of non-damage situations including initial manufacture, augmentation, reconfiguration, and the like. In various situations, the additional material must be added adjacent an internal space such as a portion of the passageway network. It may be desirable to use a sacrificial backing/blocking element to block the internal space from entry of the additional material and serve as a backing scaffold as the additional material is built up atop the backing/blocking element. Some uses for such backing/blocking elements involve the preservation of an outlet to a surface of the component. Other situations involve deporting the additional material to close an opening. For example, the opening may be a breach to an internal cavity formed by damage or formed by machining to clean the damaged surface or further to true the damaged surface.

Figure 2:
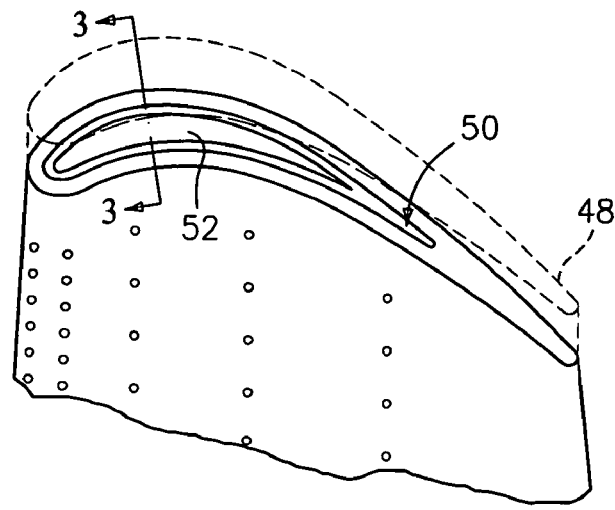
FIG. 2 is an enlarged view of a portion of the airfoil of the blade of FIG. 1 during repair.
Figure 3:
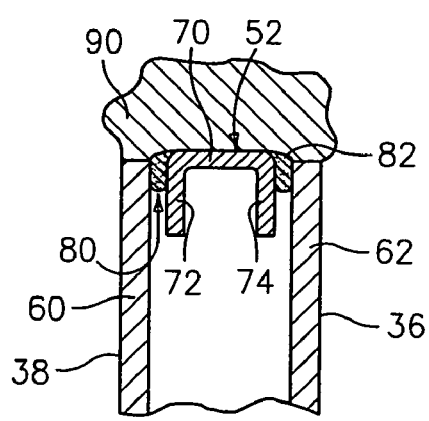
FIG. 3 is a sectional view of the airfoil of FIG. 2 taken along line 3-3.

FIG. 2 shows an exemplary such situation where a tip portion 48 at the tip 30 has been removed, exposing a cooling passageway/cavity 50. To block the cavity 50 and provide a partial base for the additional material, a refractory insert may be installed as a portion of backing/blocking element in the cavity 50 and may protrude a desired distance therefrom. FIG. 3 shows the insert 52 positioned between pressure and suction sidewall portions 60 and 62 of the airfoil 24. An exemplary insert 52 may be stamped or otherwise cut and formed from sheet metal. The exemplary insert 52 includes a central web 70 shaped generally to correspond with the cavity 50. The exemplary insert 52 includes a wall structure having pressure and suction side portions 72 and 74 extending into the cavity 52.

Due to manufacturing or other constraints, there may be one or more gaps 80 between the insert 52 and the adjacent intact portions of the blade. To close these gaps 80 and optionally help secure the insert 52, a refractory metal paste bead 82 may be applied between the blade and the insert 52. An exemplary paste 82 may be formed of a refractory metal powder and a binder. Together, the insert 52 and bead 82 may form the blocking/backing element. After introduction, the bead 82 may be subject to one or more further shaping steps such as sculpting (e.g., to form a smooth continuous shape with the insert 52 to form a desired ultimate shape for the cavity along the additional material). Thereafter, the additional material 90 may be applied.

Figure 4:
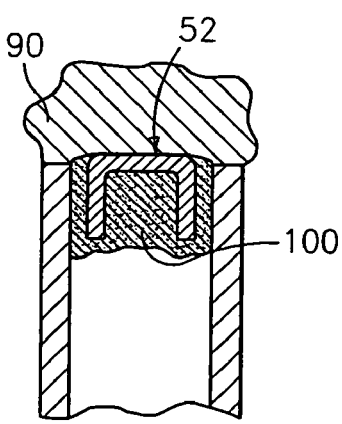
FIG. 4 is a similar sectional view of the airfoil of FIG. 1 during an alternative repair.

FIG. 4 shows an alternative implementation wherein the insert 52 is pre-embedded in a refractory metal paste body 100. The combination is then inserted into the cavity 52. During insertion, the body 100 may deform to accommodate the blade. After initial insertion, there may be further shaping/forming steps. These steps may include removal of any excess material shifted from the refractory metal paste body 100 during insertion.

FIGS. 5 and 6 show an alternate implementation wherein a refractory metal paste 120 is used to form a backing element in the absence of a separate pre-formed insert or other part. The paste 120 may be molded or sculpted in situ by any of a variety of techniques.

FIG. 7 shows a vane 200 having an airfoil 202 extending between an inboard platform 204 and an outboard shroud 206. The airfoil has leading and trailing edges 208 and 210, respectively. A vane cooling passageway network includes outlets in the form of leading edge cooling holes 212 and trailing edge slots 214. As with blade airfoils, the airfoil's leading edge region may be particularly susceptible to foreign object damage and the trailing edge region may be particularly susceptible to thermal-mechanical fatigue. Thus, the leading edge may have chips 220 and there may be cracks 222 extending from the slots 214 (e.g., along the pressure side). FIGS. 8 and 9 show refractory metal paste material 230 having been injected into the cooling holes 212 and outlet slots 214 to in situ form blocking/backing elements. The paste 230 prevents infiltration of additional material 232 built up on the vane adjacent the cooling hole 212 and slot 214.

The additional material 90 and 232 may be applied via a number of processes. Exemplary processes are high energy processes such as laser cladding and diffusion blazing. A preferred diffusion braze involves use of a transient liquid phase (TLP) forming process such as disclosed in U.S. Pat. No. 4,008,844, the disclosure of which is incorporated by reference herein as if set forth at length. In this process, powders of multiple alloys are provided either pre-mixed or mixed by the application apparatus. The component powders may be selected in view of the workpiece properties. The exemplary powder material includes a TLP-forming powder and a main powder. The exemplary main powder may have a composition similar to the desired deposit (and to the substrate material). The TLP powder may have an otherwise generally similar composition but including at least one melting point depressant such as boron and/or silicon. A substantially higher concentration of such depressant in the TLP-forming powder than in the main powder permits a relatively low melting point for the TLP-forming powder and facilitates infiltration of the melted TLP-forming powder into the main powder and substrate. Such depressant in the main powder would essentially be wasted and would add to the total depressant in the repair (thereby compromising the remelt temperature).

The workpiece (e.g., the exemplary blade 22 and vane 200) may consist of or comprise a nickel- or cobalt-based superalloy substrate (e.g., such a substrate may have a protective coating). The methods may be used to form a deposit for replacing material lost from the substrate (e.g., due to damage plus cleaning and preparation) or to augment (e.g., fill a manufacturing defect, coat with a dissimilar material, or otherwise).

Prior to material application, the site may be cleaned of contamination. Protective coatings may be locally or globally removed or left in place. Coating removal may be by grit blast (e.g., for ceramic barrier coatings) or by exposure to liquid acids (e.g., a hydrochloric/nitric acid solution for removal of metallic coatings). Additional steps such as vacuum cleaning, or fluoride ion cleaning may be employed to remove tenacious oxides formed during engine operation. When oxidation products extend into deep cracks, fluoride cleaning as is most appropriate. Corrosive products may also be removed by chemical means or by grit blast.

If used, the insert 52 may be pre-formed of a refractory metal (e.g., selected from the group consisting of niobium, tantalum, molybdenum, tungsten, and alloys/combinations thereof). Exemplary forming may be from sheet stock and include cutting and shaping (e.g., folding/bending or stamping). The paste 82, 100, 120, and 230 may be formed by mixing one or more powders of such refractory metals with one or more binders. An exemplary binder is NICROBRAZ S binder from Wall Colmonoy Corporation, Madison Heights, Mich. It may be particularly advantageous to use a mixture of different refractory metals to optimize diffusion properties of the paste (e.g., the degree to which the paste acts as a sink to extract melting point depressants from the applied material 90 and 232). The depressant extraction removes a portion of the depressant that would otherwise remain in the applied material and adjacent substrate material. This increases the remelt temperature of the applied material and adjacent substrate material to improve ultimate component performance. Similarly, the paste mixture may contain non-refractory components. These non-refractory components could be substituted to achieve a desired interaction with the repair material and/or substrate (e.g., providing components to diffuse into the repair material, components to act as a sink, or components for otherwise chemically reacting).

In the exemplary TLP repair, after backing/blocking element formation, paste patches of the repair material are applied at the sites on the component. An exemplary viscous repair material paste is formed by combining the alloy powders and a suitable volatile binder which is flux free to avoid contamination. The binder is capable of being burned off without leaving an undesirable residue when the paste is heated. Advantageously, the binder burns off well before melting of the TLP material begins (e.g., burns off at or below 1000° F.). An exemplary binder is NICROBRAZ S binder from Wall Colmonoy Corporation, Madison Heights, Mich.

To initiate the bonding, the pasted airfoil is heated. In an exemplary processing cycle, the component and paste are heated in a suitable protective atmosphere (e.g., inert gas, vacuum, or other gas not adversely interacting with the process). An exemplary temperature for a nickel-based superalloy system is about 2200° F. (e.g., 2150-2275° F.). An exemplary duration of this heating is 5-24 hours (e.g., about ten hours). The heating is advantageously sufficient to provide substantial diffusion of the depressant throughout the second powder and into adjacent substrate with a portion being taken by the backing/blocking element. Following this heating the component may be rapidly cooled. In a second exemplary processing cycle for a cobalt-based superalloy system, the component and paste are heated in a suitable protective atmosphere to a greater temperature for a much shorter duration. An exemplary temperature is about 2300° F. (e.g., 2250-2350° F.). An exemplary duration of this heating less than about thirty minutes, preferably fifteen minutes or less and is followed by rapid cooling.

The backing/blocking element may then be removed by leaching. The exterior contour of the component may be restored by machining the applied material. The component may then be subjected to an aging heat treatment. A coating may be applied (either overall or locally atop the machined patch areas if coating is elsewhere intact).

One or more embodiments of the present invention have been described. Nevertheless, it will be understood that various modifications may be made without departing from the spirit and scope of the invention. For example, although particularly useful with turbine blades and vanes, the methods may be applied to other blades and other turbine engine parts and non-turbine parts. Details of the particular turbine engine part or other piece and the particular wear or damage suffered or susceptible to may influence details of any given restoration. Accordingly, other embodiments are within the scope of the following claims.

What is claimed is:

1. A method for forming or remanufacturing a component to have an internal space comprising;
    forming, in situ, a blocking element with at least a portion to be within the internal space, said blocking element being refractory metal based, the forming including:
        inserting a pre-formed first part of said blocking element; and
        forming, in situ, a second part of said blocking element, said second part comprising a mixture of a binder and a powder containing one or more refractory metals;
    after the forming, adding a material to the component by at least one of welding, laser cladding, and diffusion brazing, the blocking element at least partially blocking entry of the material to the internal space; and
    removing the blocking element.

2. The method of claim 1 wherein:
    the adding comprises diffusion brazing using a powdered material comprising a mixture of first and second component powders, the second powder being a majority, by weight, of the powdered material and the first powder acting to infiltrate the second powder upon melting of the first powder.

3. The method of claim 2 wherein:
the first powder component includes in its composition a quantity of a melting point depressant substantially in excess of that in the second powder.

4. The method of claim 2 wherein:
the first and second component powders are present in a mass ratio of between 1:10 and 1:2.

5. The method of claim 2 wherein:
the first component powder has at least 2.5% by weight boron; and
the second component powder has less than 0.5% by weight boron.

6. The method of claim 2 wherein:
the first component powder has at least 2% by weight boron; and
the second component powder has less than 1% by weight boron.

7. The method of claim 2 wherein:
the first and second component powders are nickel based.

8. The method of claim 1 wherein the forming comprises:
forming said first part including one or more of:
  cutting;
  stamping; and
  casting.

9. The method of claim 8 wherein said second part consists essentially of said refractory metal powder and said binder.

10. The method of claim 8 wherein said refractory metal powder comprises a mixture of refractory metals.

11. The method of claim 1 wherein:
the internal space extends to a damage site from which the component has lost first material.

12. The method of claim 11 wherein:
the method further comprises removing additional material at least partially from the damage site to create a base surface; and
the adding of the material adds the material atop the base surface at least partially in place of the first material and the additional material.

13. The method of claim 11 wherein:
said material in major part replaces said first material.

14. The method of claim 1 wherein:
the portion comprises a first portion inserted within a pre-existing portion of the internal space and a second portion.

15. The method of claim 1 wherein:
the component had previously lacked said internal space.

16. The method of claim 1 wherein:
the blocking element has a first surface portion having a shape effective to re-form an internal surface portion of the component bounding the internal space;
the placing causes the first surface portion to at least partially protrude from an intact portion of the component; and
the adding of the material includes adding the material atop the first surface portion.

17. The method of claim 1 wherein:
the component is an internally-cooled gas turbine engine turbine section element.

18. The method of claim 1 wherein said material is selected from the group consisting of Ni- or Co-based superalloys.

19. The method of claim 1 wherein said component comprises a substrate material selected from the group consisting of Ni- or Co-based superalloys.

20. The method of claim 1 wherein the component is a blade having an airfoil and the material is added along a tip of the airfoil.

21. The method of claim 1 wherein the component is a blade having an airfoil and the material is added along a trailing edge of the airfoil.

22. The method of claim 1 wherein the material is added to a depth of at least 2.0 mm.

23. The method of claim 1 further comprising:
machining the material to restore an external contour of the airfoil.

24. The method of claim 1 wherein the removing comprises at least one of chemically removing and mechanically removing.

25. The method of claim 1 wherein:
the forming, in situ, comprises shaping the mixture of the binder and the powder.

26. A method for forming or remanufacturing a component to have an internal space comprising;
forming, in situ, a blocking element with at least a portion to be within the internal space, said blocking element being refractory metal based, wherein the forming comprises:
  mixing a refractory metal powder and a binder; and
  applying the mixed refractory metal powder and binder to the component;
after the forming, adding a material to the component by at least one of welding, laser cladding, and diffusion brazing, the blocking element at least partially blocking entry of the material to the internal space; and
removing the blocking element.

27. The method of claim 26 wherein the forming further comprises:
shaping the applied refractory metal powder and binder.

* * * * *